UNITED STATES PATENT OFFICE.

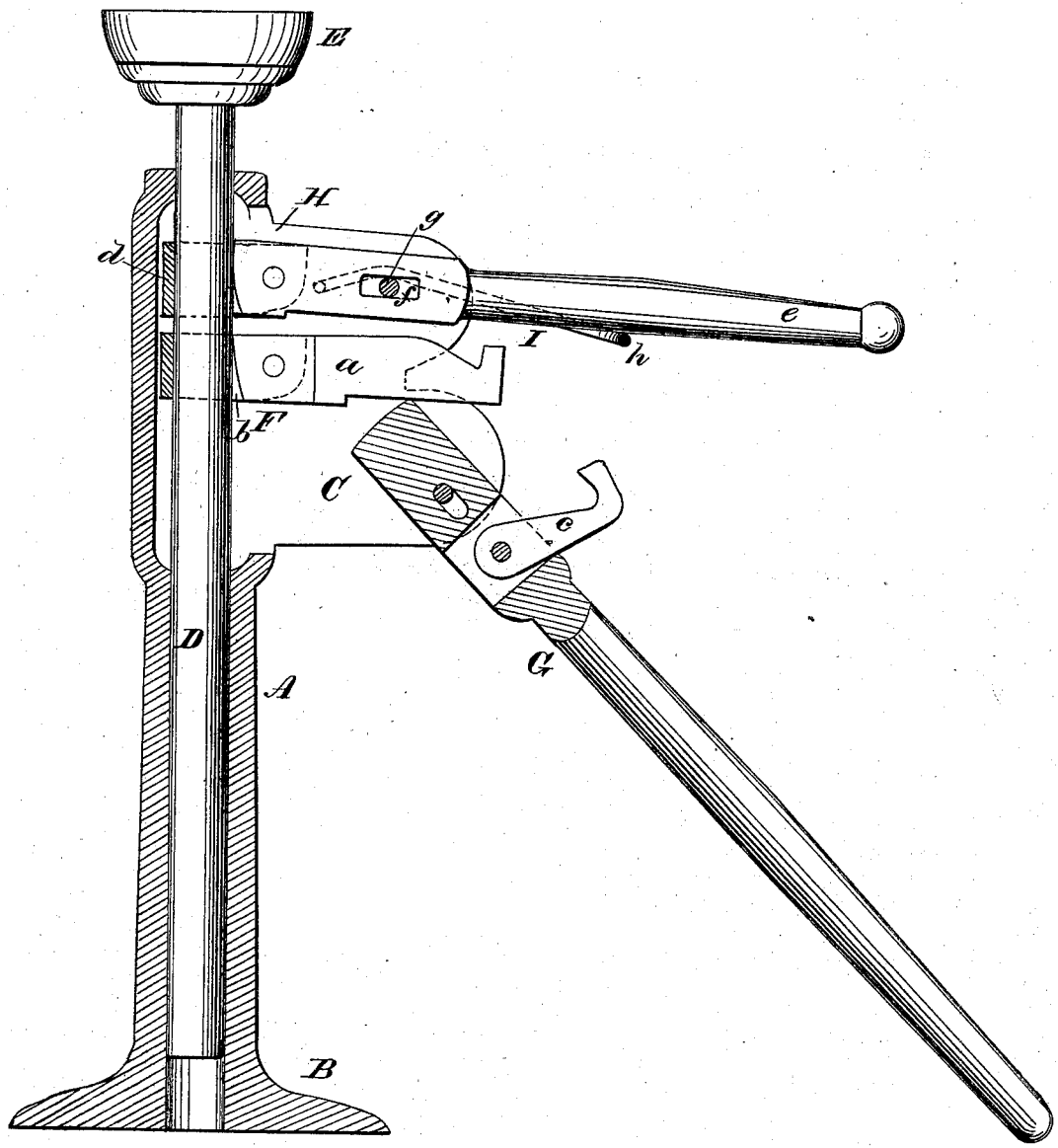

LORENZO MEEKER, OF OSWEGO, NEW YORK.

IMPROVEMENT IN LIFTING-JACKS.

Specification forming part of Letters Patent No. 198,656, dated December 25, 1877; application filed November 26, 1877.

*To all whom it may concern:*

Be it known that I, LORENZO MEEKER, of Oswego, in the county of Oswego and State of New York, have invented a new and Improved Lifting-Jack, of which the following is a specification:

My invention relates to certain improvements in lifting-jacks of that class in which a central bar is arranged inside of a tubular standard, which bar is progressively elevated by clutch devices.

It consists in the peculiar construction of a clutch and lever for lifting the load, in combination with a clutch for sustaining the load during the alternate movement of the lifting-clutch; in the particular construction and arrangement of the clutch and lever for sustaining the load; and in the devices for disengaging the clutch from the bar, when it is desired to retract or lower the latter.

Referring to the drawing, which is a vertical section, A is a tubular standard, having the foot or base piece B and brackets C, for supporting the operating and clutch levers. A bar, D, is fitted to the tubular standard, and is provided with a head, E, which is placed against the object to be moved or lifted.

Upon the bar D a clutch, F, is placed, which consists of a short lever, a, that is pivoted between the ends of the strap b that surrounds the bar. The shorter arm of the lever a is concaved and fitted to the bar D, and is beveled, so that it will pinch the bar when the longer arm of the lever is raised, and will release the bar when the said arm is depressed.

A hand-lever, G, is pivoted between the brackets C, and arranged so that its shorter arm may engage the under surface of the long arm of the lever a.

A hook, c, is pivoted in a mortise in the lever G, and is arranged to engage the long arm of the lever a, which is notched to receive the end of the hook.

The hole in the lever G through which its pivot passes is made oblong, to admit of the longitudinal movement of the lever, when it is connected with the lever a by the hook c.

A clutch, H, is placed on the bar D, for retaining the load after it is raised. This clutch consists of a strap, d, which partly surrounds the bar D, and has pivoted between its ends the end of the lever I, which is fitted to the bar, and beveled in the same manner as the lever a. The longer arm of the lever I is formed into a handle, e. A slot, f, is formed in the lever I to receive the pin g, which passes through the brackets C.

A spring, h, is secured to the brackets C, and presses the long arm of the lever upward, bringing the clutch into engagement with the bar D.

By depressing the longer arm of the lever G the lever a is raised, so as to pinch the bar D, after which the clutch F and bar D are raised together. By raising the lever G the clutch is released, when it drops of its own weight, and is ready to take another bite. The load is sustained by the clutch H when the clutch F is released.

When it is desired to retract the bar D the hook c is placed on the end of the lever a, when, by depressing the lever G, the lever a is turned on its pivot and releases the bar D. By depressing the handle the bar D is released from the clutch H, when it will drop into the tubular standard.

Having thus described my invention, I claim as new and desire to secure by Letters Patent—

1. The combination of the loose sliding clutch F, the lever G, having hook c, the sustaining-clutch H, the handled lever I, and the spring h, substantially as and for the purpose described.

2. The combination of the hook c, lever G, and clutch F, substantially as and for the purpose specified.

3. The clutch H, having the handled lever I, the spring h, and the bar D, in combination, substantially as herein shown and described.

LORENZO MEEKER.

Witnesses:
NORMAN HOLLEY,
WM. J. DOWDLE.